UNITED STATES PATENT OFFICE.

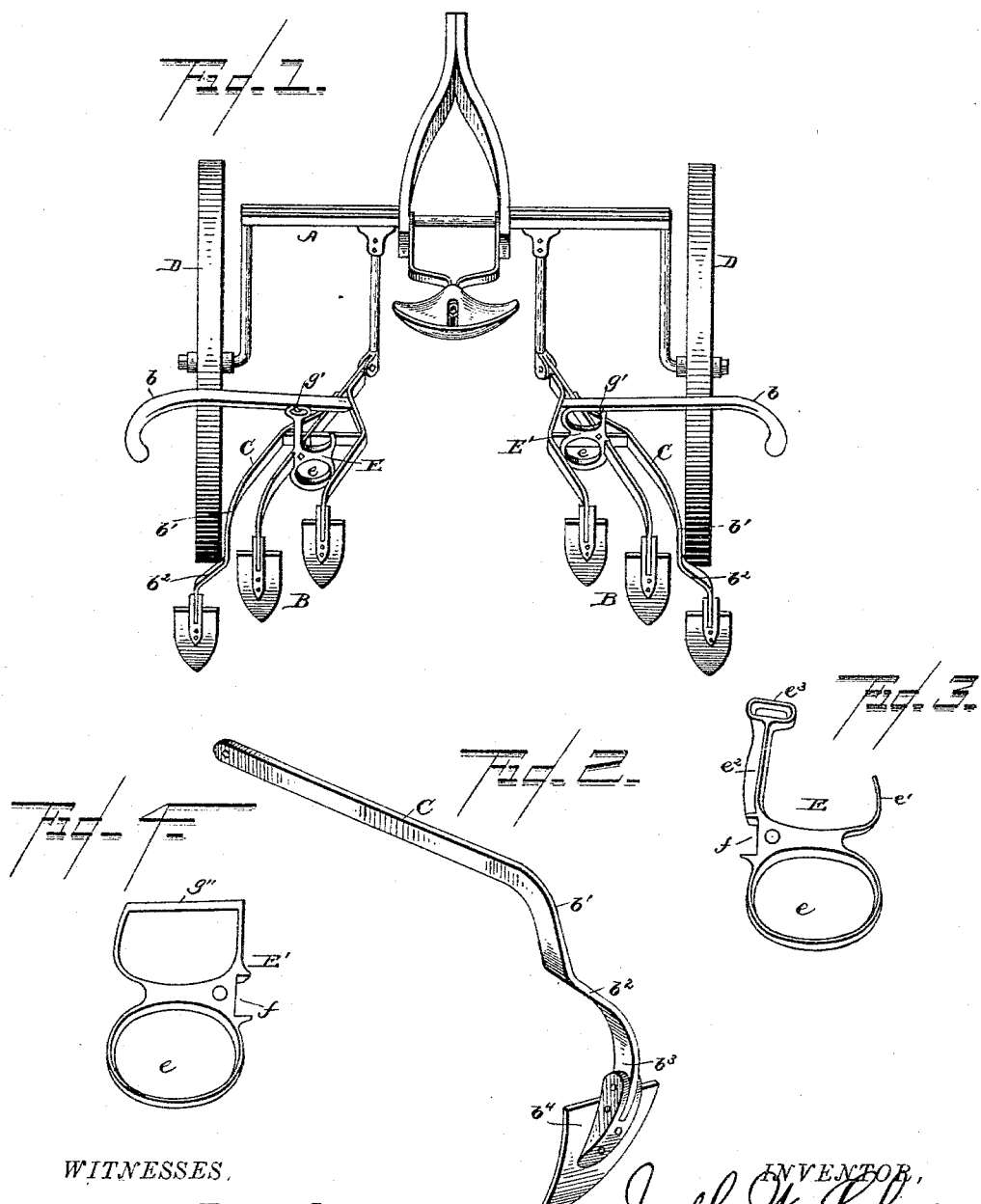

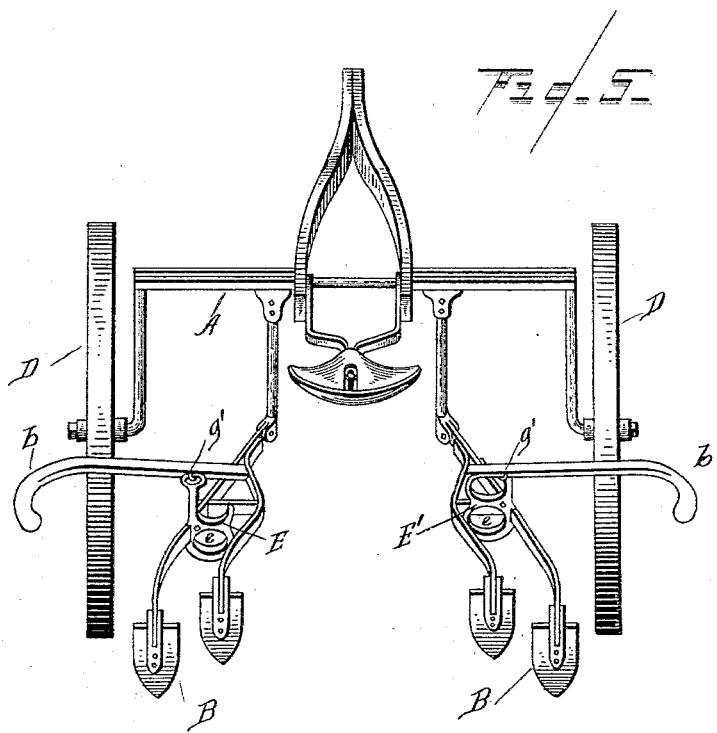

JOSEPH W. LEHR AND NICHOLAS P. LEHR, OF FREMONT, OHIO.

CULTIVATOR.

SPECIFICATION forming part of Letters Patent No. 389,088, dated September 4, 1888.

Application filed April 3, 1888. Serial No. 269,493. (No model.)

*To all whom it may concern:*

Be it known that we, JOSEPH W. LEHR and NICHOLAS P. LEHR, citizens of the United States of America, residing at Fremont, in the county of Sandusky and State of Ohio, have invented certain new and useful Improvements in Cultivators, of which the following is a specification, reference being had therein to the accompanying drawings.

This invention pertains to certain new and useful improvements in cultivators, having reference more particularly to straddle-row cultivators, both walking and riding.

The object of the invention is to provide an improved double stirrup and adjustable handle-holder, whereby said stirrup is applicable for long and short legged operators, and the handles can be conveniently swung from side to side at their rear ends, as the operator may desire, and to avoid the necessity of detaching the handles when the cultivator is used in a riding form.

The invention therefore comprises the peculiar construction, combination, and arrangements of parts, substantially as hereinafter fully set forth, and particularly pointed out in the claims.

In the accompanying drawings, Figure 1 is a rear end view of the cultivator, showing our invention as applied thereto; Figs. 2, 3, and 4 are detail views; and Fig. 5 is a view similar to Fig. 1, showing four cultivator-shovels.

Referring to the drawings, A designates the cultivator-frame, of any preferred form of construction, the same being either a walking or riding cultivator, as desired, the invention not being limited in this particular.

B B indicate the two series of cultivator-shovels, the forward end of the central drag-bar of each of said series being connected by suitable means to the cultivator-frame. Each series of cultivator-shovels is composed, preferably, of three shovels and their accompanying drag-bars, to the central ones of which are pivotally secured the forward ends of handles $b$ $b$. The outer drag-bars of each series of shovels consist of a bar, C, connected at its forward end by suitable means to the adjoining central drag-bar, and said bar is extended a short distance in rear of said adjoining central drag-bar, and is then curved downwardly, as at $b'$, thence projected outwardly on an incline, as at $b^2$, to a point directly in rear of the carrying-wheel D, and from this point said bar is bent into an approximately vertical portion, $b^3$, to which is secured the cultivator-shovel $b^4$. From this it will be seen that the cultivator-shovels of the outer drag-bars are capable of occupying places directly in rear of the carrying-wheels of the cultivator, while the shovels of the other inner drag-bars are located within the space between the two carrying-wheels, as shown. By this means the extent of the lateral movement of each series of drag-bars and shovels is greatly increased, and is of special advantage in narrow-track cultivators, and by reason of the outer cultivator-shovels being capable of being moved the desired distance in rear or to one side of the carrying-wheels the operator is enabled to readily dodge or avoid any zigzag hills or inequality in the earth.

E E' are the right and left hand double stirrups secured to one of the drag-bars of each series, said stirrups being attached to the central drag-bar when three drag-bars compose each series, or to the outer one when two drag-bars are employed, as shown in Fig. 5. The left-hand stirrup, E, consists of a curved or round lower bar or loop, $e$, and an upper slightly-curved bar, $e'$, the outer end of which is formed into a vertical portion, $e^2$, in which is formed at its upper end a small loop having a connecting-bar, $e^3$. The right-hand stirrup, E', is formed substantially like that above described, save that in lieu of the vertical arm $e^2$ the sides of the upper portion of the stirrup are connected by a bar, $g''$. In the outer side of each stirrup is formed a groove or recess, $f$, the upper and lower end walls of which are slightly inclined or beveled. Each stirrup is secured in position on its respective drag-bar by means of the end walls of the groove or recess $f$ fitting upon the side and upper and lower edges of said drag-bar, and held in position by a bolt passed through flange of stirrup and drag-bar. The right and left handles $b$ are loosely connected by means of ordinary staples, $g'$, to the connecting-bars $g''$ and $e^3$ of the stirrups E E', whereby said handles are held out of the way of the operator when the cultivator is used in a riding form, and in convenient reach to permit him to shift the right-hand handle from side to side.

The object of employing the two forms of stirrups is, that the right-hand handle, when the device is used as a walking-cultivator, is swung to the extreme left, and when used in the riding form said handle is moved to the extreme right and out of the way of the operator, while the left-hand handle is never moved, but remains held out of the way by the vertical portion of its stirrup. The double stirrups are rendered convenient for a long or short legged operator, as is obvious.

The advantages of our invention will be apparent to those skilled in the art to which it appertains, and by means thereof the objections heretofore experienced in employing narrow-track cultivators, particularly on hilly or uneven soil, are obviated, and the peculiar formation given the outer drag-bars permits the shovels to be moved closer to the carrying-wheels than could be done by devices heretofore known and used; and the necessity of removing the handles when the plow is used in a riding form is also obviated, and the same can be moved from side to side, as found necessary by the operator in shifting the drag-bars.

We claim as our invention—

1. As an improvement in cultivators, the herein-described combined double stirrup and handle-rest secured to the drag-bars and having upper connecting-bars, substantially as shown and described.

2. As an improvement in cultivators, the herein-described double stirrup and handle-rest having the grooves or recesses $f$, the end walls of which are inclined or beveled, and the nutted bolts for securing said stirrup in position, substantially as shown and described.

3. The herein-described double stirrup and adjustable handle-rest E′, having vertical arms provided with a connecting bar, $g''$, substantially as shown and described.

4. In combination with the stirrup and handle-rest E′, the double stirrup and fixed handle-rest E, consisting of the lower loop, the upper curved bar, the vertical arm $e^2$, having a loop in its upper end, and the groove or recess having inclined or beveled end walls, and the nutted bolts, substantially as shown and described.

In testimony whereof we affix our signatures in presence of two witnesses.

JOSEPH W. LEHR.
NICHOLAS P. LEHR.

Witnesses:
M. D. WELLER,
GEO. KINNY.